(12) United States Patent
Tanaka

(10) Patent No.: US 10,988,039 B2
(45) Date of Patent: Apr. 27, 2021

(54) POWER TRANSFER DEVICE, CONTROL METHOD AND RECORDING MEDIUM

(71) Applicant: DAIHEN Corporation, Osaka (JP)

(72) Inventor: Ryouhei Tanaka, Osaka (JP)

(73) Assignee: DAIHEN Corporation, Osaka (JP)

(*) Notice: Subject to any disclaimer, the term of this patent is extended or adjusted under 35 U.S.C. 154(b) by 0 days.

(21) Appl. No.: 16/510,100

(22) Filed: Jul. 12, 2019

(65) Prior Publication Data

US 2020/0031244 A1 Jan. 30, 2020

(30) Foreign Application Priority Data

Jul. 24, 2018 (JP) .............................. JP2018-138866

(51) Int. Cl.
*B60L 53/124* (2019.01)
*H02J 7/02* (2016.01)
*H02J 50/60* (2016.01)
*H02J 50/10* (2016.01)

(52) U.S. Cl.
CPC .......... *B60L 53/124* (2019.02); *H02J 7/025* (2013.01); *H02J 50/10* (2016.02); *H02J 50/60* (2016.02)

(58) Field of Classification Search
CPC ........ B60L 53/124; H02J 50/10; H02J 50/60; H02J 7/02; H02J 7/025; H02J 7/00; H02J 5/005
USPC .............. 307/104, 149, 109, 66, 64, 38, 17; 340/870.31, 870.16
See application file for complete search history.

(56) References Cited

U.S. PATENT DOCUMENTS

| 5,801,644 | A  | * | 9/1998  | Ruthroff ............... G08C 17/04 340/870.16 |
| 2011/0088204 | A1 | * | 4/2011  | Kim ......................... A47L 5/24 15/347 |
| 2013/0015699 | A1 | * | 1/2013  | Mita ..................... B60L 53/122 307/9.1 |
| 2015/0364944 | A1 | * | 12/2015 | Garcia Briz ............ H02J 50/90 307/104 |
| 2016/0013664 | A1 | * | 1/2016  | Maekawa ............... H01F 38/14 307/104 |
| 2017/0338685 | A1 | * | 11/2017 | Jung ...................... H02J 7/0021 |
| 2019/0118657 | A1 | * | 4/2019  | Wang ..................... B60L 53/12 |
| 2019/0305826 | A1 | * | 10/2019 | Park ........................ H02J 50/10 |

FOREIGN PATENT DOCUMENTS

JP 2015-6056 A 1/2015

* cited by examiner

*Primary Examiner* — Nguyen Tran
*Assistant Examiner* — Jagdeep S Dhillon
(74) *Attorney, Agent, or Firm* — Rudy J. Ng; Bret E. Field; Bozicevic, Field & Francis LLP

(57) ABSTRACT

A power transfer device comprises a power transfer coil; a case that has a surface extending along a direction perpendicular to an axial direction of the power transfer coil and stores the power transfer coil; a rotating shaft rotatable about the shaft that extends in the axial direction of the power transfer coil at a central portion in a radial direction of the power transfer coil and has an end penetrating the surface and protruding outward through the surface; a foreign object remover that projects outwardly from the end of the rotating shaft in a radial direction of the rotating shaft and moves on the surface; a driving source that provides the rotating shaft with power; and a processor that determines whether or not a vehicle is present. The driving source is driven if the processor determines that the vehicle is present.

5 Claims, 11 Drawing Sheets

POWER TRANSFER DEVICE, CONTROL METHOD AND RECORDING MEDIUM

CROSS-REFERENCE TO RELATED APPLICATIONS

This Non-provisional application claims priority under 35 U.S.C. § 119(a) on Patent Application No. 2018-138866 filed in Japan on Jul. 24, 2018, the entire contents of which are hereby incorporated by reference.

FIELD

The present technique relates to a power transfer device for transferring power, a control method and a recording medium.

BACKGROUND AND SUMMARY

A contactless power supply device having a rectangular power supply surface has conventionally been proposed. The power supply surface is provided with two wiper parts. Two driving shafts are diagonally provided at two corners of the power supply surface. The wiper parts are coupled to the driving shafts so as to rotate about the driving shafts. The rotation of the wiper parts removes a foreign object adhering to the power supply surface.

To prevent interference between multiple wiper parts of the contactless power supply device, the wiper parts need to be rotated in order, which tends to complicate wiper control.

The present disclosure is made in view of such circumstances, and it is an object of the present disclosure to provide a power transfer device capable of simplifying the control for removing a foreign object.

A power transfer device according to the present disclosure comprises a power transfer coil; a case that has a surface extending along a direction perpendicular to an axial direction of the power transfer coil and stores the power transfer coil; a rotating shaft rotatable about the shaft that extends in the axial direction of the power transfer coil at a central portion in a radial direction of the power transfer coil and has an end penetrating the surface and protruding outward through the surface; a foreign object remover that projects outwardly from the end of the rotating shaft in a radial direction of the rotating shaft and moves on the surface; a driving source that provides the rotating shaft with power; and a processor that determines whether or not a vehicle is present. The driving source is driven if the processor determines that the vehicle is present.

According to the present disclosure, if a vehicle is present, the driving source is driven to thereby rotate the foreign object remover. The foreign object remover removes the foreign object adhering to the surface of the case and prevents a living body such as a person, a dog, a cat or the like from entering the surface.

The power transfer device according to the present disclosure further comprises an accepter that accepts power transfer starting operation, and the driving source is driven if the processor determines that the vehicle is present, and the accepter accepts a start of power transfer.

According to the present disclosure, the foreign object remover is rotated only if power transfer is clearly intended, which enables reduction in electric power consumption of the power transfer device.

The power transfer device according to the present disclosure further comprises a foreign object detector that detects a foreign object, and the driving source is driven if the processor determines that the vehicle is present and a foreign object is detected by the foreign object detector.

According to the present disclosure, the foreign object remover is rotated only if a foreign object is detected, which enables reduction in electric power consumption of the power transfer device.

In the power transfer device according to the present disclosure, the driving source includes a motor, wherein the processor determines whether or not a foreign object is detected by the foreign object detector after rotation of the motor; and the processor changes a rotation speed of the motor to a rotation speed higher than a current rotation speed or a driving duration of the motor to a driving duration longer than a current driving duration if the second processor determines that a foreign object is detected, and the motor is driven based on a rotation speed or a driving duration changed by the processor.

According to the present disclosure, if a foreign object remains on the surface of the case after rotation of the motor, the rotation speed of the motor is changed to a higher rotation speed, or the driving duration of the motor is changed to a longer driving duration. The motor is rotated again based on the changed rotation speed and driving duration, which accelerates the removal of the remaining foreign object and also prevents entry of a living body into the surface.

In the power transfer device according to the present disclosure, the driving source includes a motor, the foreign object detector includes a torque detector for detecting a torque of the motor or a speed detector for detecting a rotation speed of the motor and determines that a foreign object is detected if a torque equal to or larger than a threshold set in advance is detected by the torque detector, or if a speed equal to or smaller than a threshold set in advance is detected by the speed detector.

According to the present disclosure, a foreign object is detected based on the torque or rotation speed of the motor.

The power transfer device according to the present disclosure, wherein the processor determines whether or not a foreign object is detected by the foreign object detector after rotation of the motor; and the processor changes a rotation speed of the motor to a rotation speed higher than a current rotation speed or a driving duration of the motor to a driving duration longer than a current driving duration if the second processor determines that a foreign object is detected, and the motor is driven based on a rotation speed or a driving duration changed by the processor.

According to the present disclosure, if a foreign object remains on the surface of the case after rotation of the motor, the rotation speed of the motor is changed to a higher rotation speed, or the driving duration of the motor is changed to a longer driving duration. The motor is rotated again based on the changed rotation speed and driving duration, which accelerates the removal of the remaining foreign object and prevents entry of a living body into the surface.

In the power transfer device according to the present disclosure, the driving source is stopped after being driven for a first predetermined time and is driven again after a lapse of a second predetermined time from stop of the driving source.

According to the present disclosure, the foreign object remover is intermittently rotated, which prevents a foreign object from staying on the surface of the case and also prevents entry of a living body into the surface.

In the power transfer device according to the present disclosure, the driving source is driven after power transfer by the power transfer coil is started.

According to the present disclosure, the foreign object remover is rotated after start of power transfer, which enables immediate removal of a foreign object that enters during the power transfer and prevents the foreign object from generating heat. This also prevents entry of a living body into the surface.

A control method according to the present disclosure is a control method of a driving source of a foreign object remover projecting outwardly from an end of a rotating shaft in a radial direction of the rotating shaft that extends in an axial direction of a power transfer coil at a central portion in a radial direction of the power transfer coil and that penetrates a surface of a case storing the power transfer coil and protrudes outward through the surface comprises driving the driving source if it is determined that a vehicle is present.

According to the present disclosure, if the vehicle approaches the power transfer coil, the driving source is driven to thereby rotate the foreign object remover. This allows the foreign object remover to remove the foreign object adhering to the surface of the case. This also prevents entry of a living body into the surface.

A recording medium according to the present disclosure is non-transitory computer-readable recording medium recording a computer program for causing a control device to control a driving source of a foreign object remover, wherein the foreign object remover projects outwardly from an end of a rotating shaft in a radial direction of the rotating shaft that extends in an axial direction of a power transfer coil at a central portion in a radial direction of the power transfer coil and that penetrates a surface of a case storing the power transfer coil and protrudes outward through the surface, the computer program causing the control device to execute a processing of driving the driving source if it is determined that a vehicle is present.

According to the present disclosure, if the vehicle approaches the power transfer coil, the driving source is driven to thereby rotate the foreign object remover. The foreign object remover removes the foreign object adhering to the surface of the case and prevents entry of a living body such as a person, a dog, a cat or the like into the surface.

In the power transfer device, a control method and a computer program according to the present disclosure, if the vehicle approaches the power transfer coil, the driving source is driven to thereby rotate the foreign object remover. The foreign object remover rotates on the surface of the case, which removes the foreign object adhering to the surface and prevents entry of a living body such as a person, a dog, a cat or the like into the surface. Mere rotation of the foreign object remover can remove a foreign object, prevent entry of a living body into the surface, and simplify control for removing a foreign object and preventing entry of a living body.

The above and further objects and features will more fully be apparent from the following detailed description with accompanying drawings.

DETAILED DESCRIPTION OF NON-LIMITING EXAMPLE EMBODIMENTS

Embodiment 1

Figure 1:
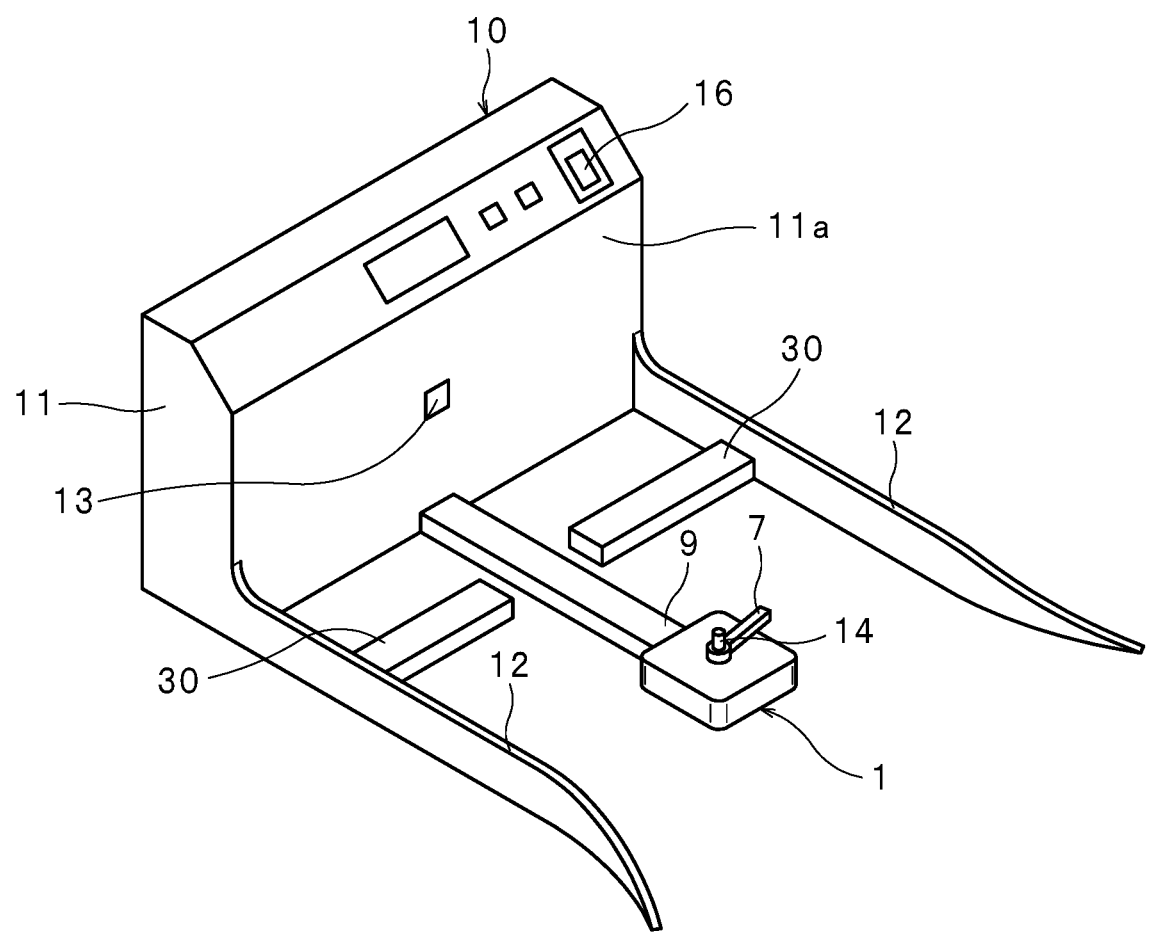
FIG. 1 is a schematic perspective view illustrating a power transfer device according to Embodiment 1.
Figure 2:
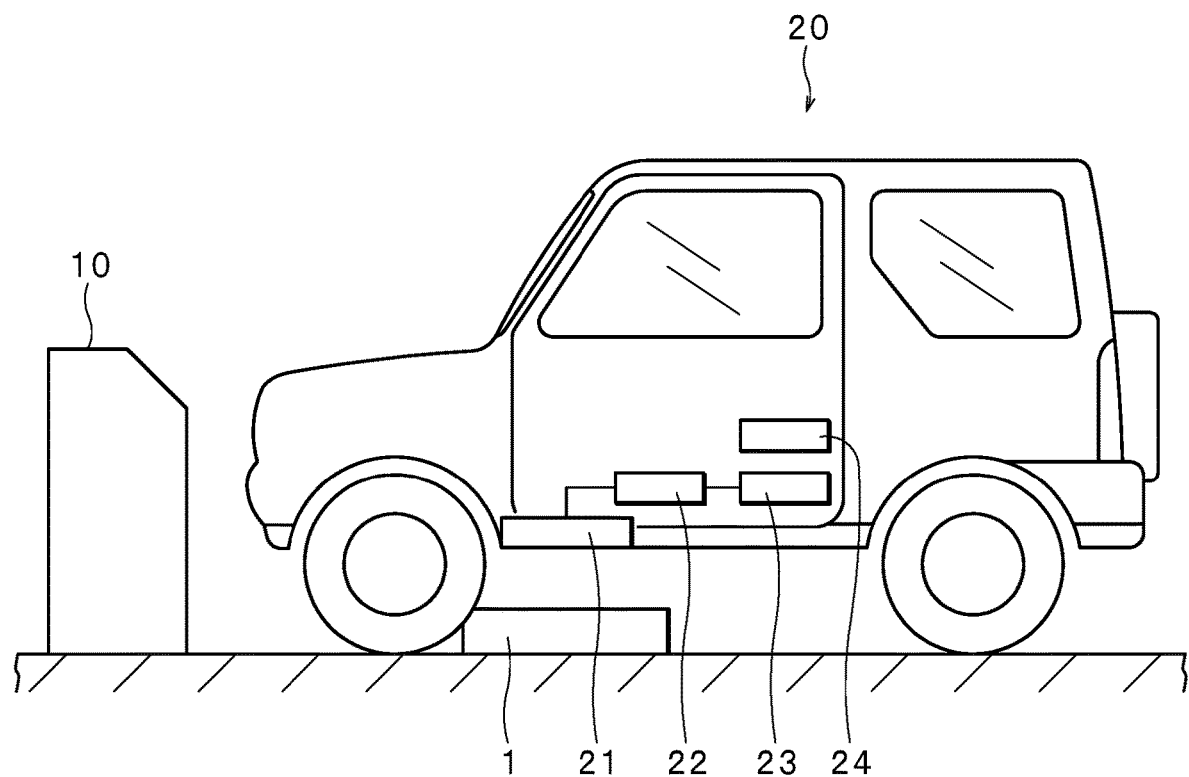
FIG. 2 is a schematic view illustrating the power transfer device and a vehicle.

The present invention will be described below with reference to the drawings illustrating a power transfer device according to Embodiment 1. FIG. 1 is a schematic perspective view illustrating a power transfer device and FIG. 2 is a schematic view illustrating the power transfer device and a vehicle 20.

The power transfer device includes a power transfer unit 1 and a power transfer control unit 10. The power transfer control unit 10 is installed on the ground. The power transfer control unit 10 has, for example, a rectangular parallelepiped housing 11. The housing 11 of the power transfer control unit 10 stores, for example, a high-frequency power supply device and a control substrate. From two opposing edges of a side surface 11a of the housing 11, two guide parts 12 for guiding the vehicle 20 protrude in the same direction. The two guide parts 12 take the shape of a long, narrow board and extend along the ground. The two guide parts 12 are disposed substantially perpendicular to the ground surface and are opposed to each other with a space between them. The protruding ends of the two guide parts 12 are outwardly curved so as to gradually increase the distance between them.

At the central portion of the side surface 11a, a proximity sensor 13 is provided. The proximity sensor 13 detects the distance between the vehicle 20 and the power transfer unit 1, for example. The power transfer control unit 10 is provided with a power transfer start switch 16 that accepts starting operation of power transfer.

The power transfer control unit 10 is connected to the power transfer unit 1 through a wiring 9. The power transfer unit 1 is installed on the ground and disposed between the two guide parts 12. The power transfer unit 1 has a power transfer coil 3 (see FIGS. 3 and 4), which will be described later. The power transfer control unit 10 supplies power to the power transfer coil 3, which causes current to flow in the power transfer coil 3.

Between the power transfer unit 1 and the power transfer control unit 10 and between the two guide parts 12, two vehicle stoppers 30, for example, are disposed. The distance between the opposite two guide parts 12 corresponds to the lateral width of the vehicle 20. For example, if the vehicle 20 is located between the two guide parts 12 and is advanced toward the power transfer control unit 10, the guide parts 12 guide the vehicle 20. The driver of the vehicle 20 can stop the vehicle 20 with the two front wheels in contact with the respective two vehicle stoppers 30.

The vehicle 20 is equipped with a power reception coil 21, a power reception unit 22, a battery 23 and a power reception control device 24. The power reception coil 21 is connected to the battery 23 via the power reception unit 22. The power reception coil 21 is arranged on the bottom surface of the vehicle 20. If the vehicle 20 is stopped at a predetermined position, for example, if the vehicle 20 is stopped while being in contact with the vehicle stoppers 30, the power reception coil 21 is so installed in the vehicle 20 as to be opposite to the power transfer unit 1. The power reception unit 22 has a rectifier circuit, a resonant capacitor and so on. The power reception coil 21 is magnetically coupled to the power transfer coil 3, so that power is contactlessly supplied from the power transfer coil 3 to the power reception coil 21 to thereby charge the battery 23. The power reception control device 24 has an antenna. The power reception control device 24 detects the state of charge of the battery 23 and communicates with the power transfer control unit 10.

Figure 3:
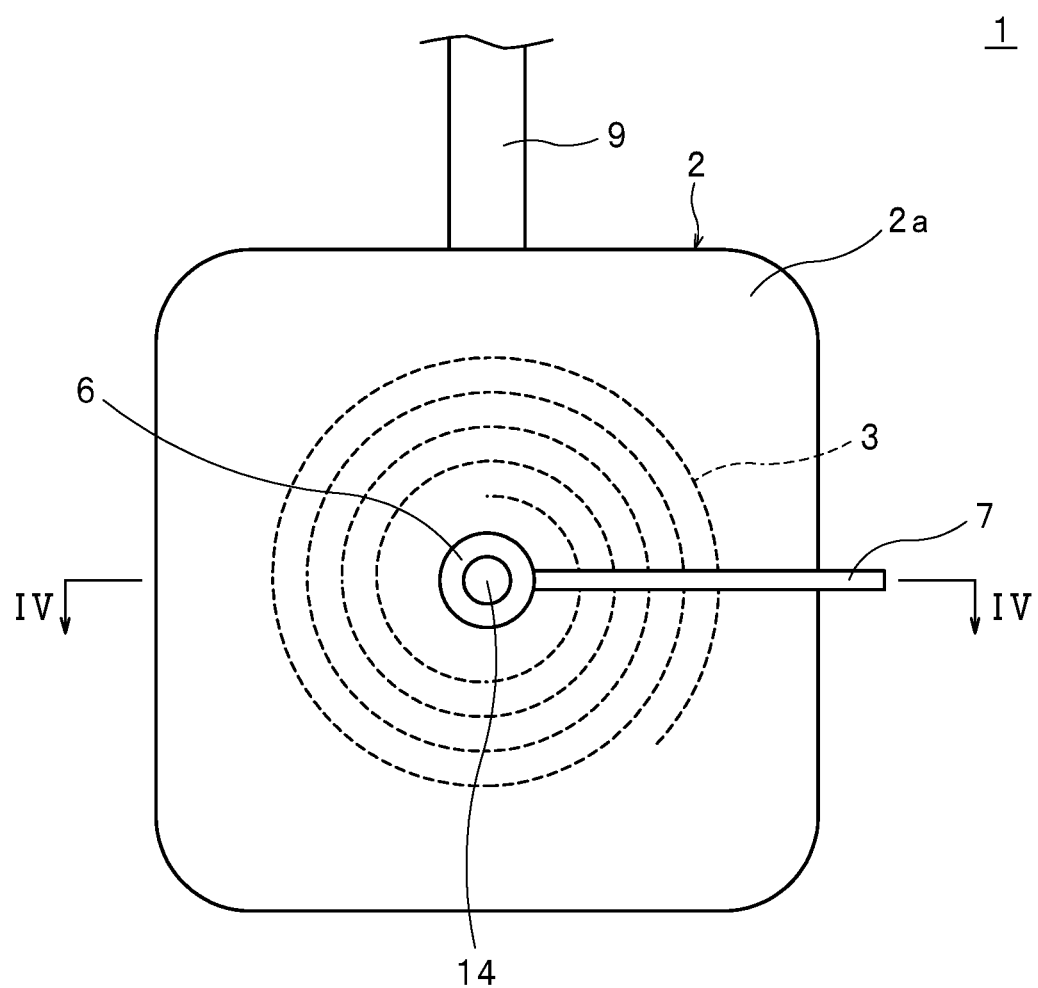
FIG. 3 is a plan view schematically illustrating a power transfer unit.
Figure 4:
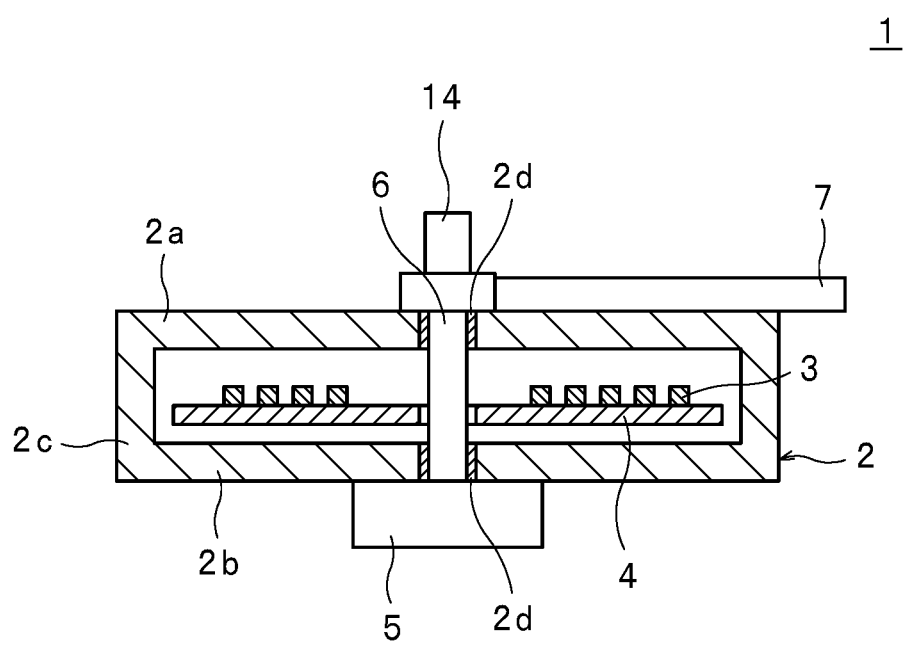
FIG. 4 is a cross-sectional view taken along line IV-IV in FIG. 3.

FIG. 3 is a plan view schematically illustrating the power transfer unit 1 and FIG. 4 is a cross-sectional view taken along line IV-IV in FIG. 3. The power transfer unit 1 has a flat rectangular parallelepiped case 2. The case 2 has a rectangular first surface part 2a and a rectangular second surface part 2b that are opposed to each other, and a peripheral surface part 2c that is disposed along the entire perimeter of the first surface part 2a and the second surface part 2b and that connects the first surface part 2a and the second surface part 2b to each other. The first surface part 2a is located above the second surface part 2b. The power transfer unit 1 is installed on the ground with the first surface part 2a exposed.

The case 2 stores a sheet-type shield 4 that is substantially parallel with the first surface part 2a and the second surface part 2b, and the power transfer coil 3 being spiral in plan view that is arranged on one surface of the shield 4. The shield 4 is made of a magnetic substance, for example, a ferrite material. The shield 4 protects a motor 5 to be described later from the magnetic field. The power transfer coil 3 is opposed to the first surface part 2a and the shield 4 is opposed to the second surface part 2b.

The motor 5 is provided on the outer surface of the second surface part 2b. The motor 5 is connected to a rotating shaft 6 that rotates about the shaft. No coil is present around the center in the radial direction of the power transfer coil 3, which produces a space encircled by the coil. The rotating shaft 6 is located around the center in the radial direction of the power transfer coil 3, i.e., the space encircled by the coil. The rotating shaft 6 extends in the axial direction of the power transfer coil 3 and penetrates the first surface part 2a and the second surface part 2b. Note that a seal member 2d is provided in the gap between the rotating shaft 6 and the first surface part 2a and the gap between the rotating shaft 6 and the second surface part 2b, which prevents liquid from entering the case 2.

One end of the rotating shaft 6 penetrates the first surface part 2a and protrudes outward through the first surface part 2a. A camera 14 is coaxially provided at the one end of the rotating shaft 6. The camera 14 can photograph a range covering 360 degrees around the rotating shaft 6 and includes, for example, an omnidirectional camera or a half celestial sphere camera. The camera 14 can photograph the entire outer surface of the first surface part 2a and the area above the first surface part 2a. In view of photographing during the night, an infrared camera or a camera with lighting may be used for the camera 14.

Note that the camera 14 may be provided on the side surface 11a of the housing 11. In this case, the camera 14 is arranged at a position closer to the ground surface of the side surface 11a, and whereby even if the vehicle 20 is located above the power transfer unit 1, the camera 14 can photograph the entire outer surface of the first surface part 2a from the space between the bottom surface of the vehicle 20 and the power transfer unit 1. The camera 14 provided in the housing 11 can also photograph the vehicle 20.

A blade 7 projects in the radial direction from the one end of the rotating shaft 6. The blade 7 extends in the radial direction of the power transfer coil 3 along the outer surface of the first surface part 2a. In the radial direction, the tip end of the blade 7 is positioned beyond the case 2. That is, the length of the blade 7 is greater than the radius of the power transfer coil 3 and is greater than the length between the center of the rotating shaft 6 and the edge of the first surface part 2a. The blade 7 is in contact with the outer surface of the first surface part 2a. The blade 7 is made of material with high flexibility and high impact resistance such as a resin material or wire, for example. Note that multiple blades 7 may be provided to radiate in all directions from the one end of the rotating shaft 6. The other end of the rotating shaft 6 penetrates the second surface part 2b so as to be connected to the motor 5.

The power transfer control unit 10 drives the motor 5, for example, before or during the execution of power transfer by the power transfer coil 3. The motor 5 is driven to thereby rotate the rotating shaft 6, so that the blade 7 rotates while being in contact with the outer surface of the first surface part 2a. If a foreign object such as a clip, a leaf, an insect, etc. adheres to the outer surface of the first surface part 2a, the blade 7 removes the foreign object. If a living body, for example, a cat is on the first surface part 2a, the living body can be moved from the power transfer unit 1 by rotation of the blade 7.

Figure 5:
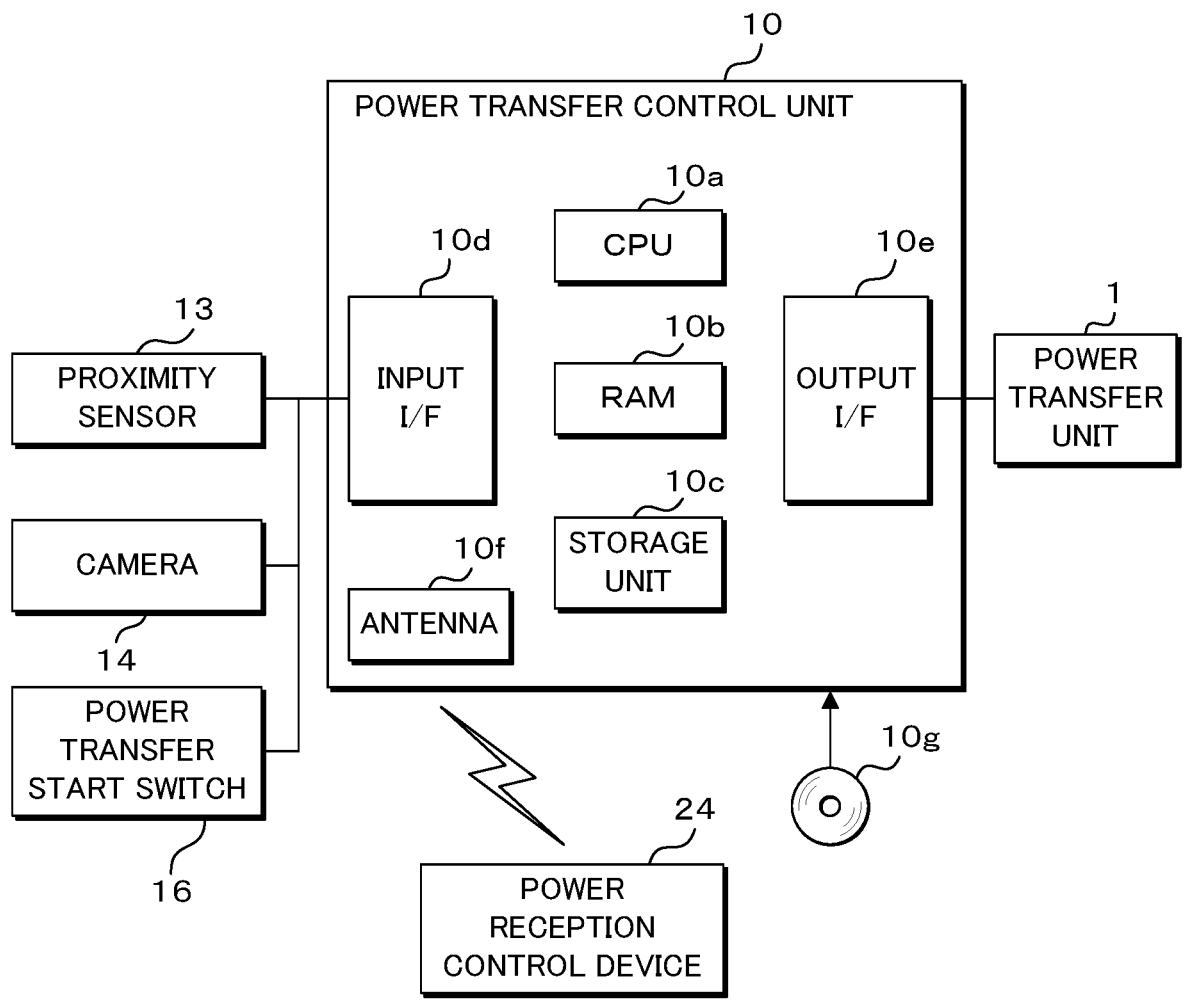
FIG. 5 is a block diagram of the power transfer device.

FIG. 5 is a block diagram of the power transfer device. The housing 11 of the power transfer control unit 10 includes a central processing unit (CPU) 10a, a random access memory (RAM) 10b, a storage unit 10c, an input interface (hereinafter referred to as an input I/F) 10d, an output interface (hereinafter referred to as an output I/F) 10e and an antenna 10f. The CPU 10a, the RAM 10b, the storage unit 10c, the input I/F 10d, the output I/F 10e and the antenna 10f are connected to each other via a common bus (not illustrated).

The storage unit 10c is composed of a nonvolatile memory, for example, an erasable programmable read only memory (EPROM), an electrically erasable programmable read only memory (EEPRPM) or the like. The CPU 10a reads out a control program stored in the storage unit 10c onto the RAM 10b and executes the program. The control program can be installed into the storage unit 10c from a recording device 10g for example CD-ROM, DVD or so, or from a server in the internet. The CPU 10a has a timer. The storage unit 10c previously stores various thresholds, the rotation speed and driving duration of the motor 5, etc. which will be described later. Note that in place of the CPU, another processor such as a micro processing unit (MPU) may be used or a logic circuit such as a field programmable gate array (FPGA) may be used.

To the Input I/F 10d, a detection result from the proximity sensor 13, imaging data from the camera 14 and an ON or OFF signal of the power transfer start switch 16 are input. From the output I/F 10e to the power transfer unit 1, a power transfer signal or a power transfer stop signal is output, and a driving signal or a driving stop signal for the motor 5 is output. The CPU 10*a* can communicate with the power reception unit 22 via the antenna 10*f*.

Figure 6:
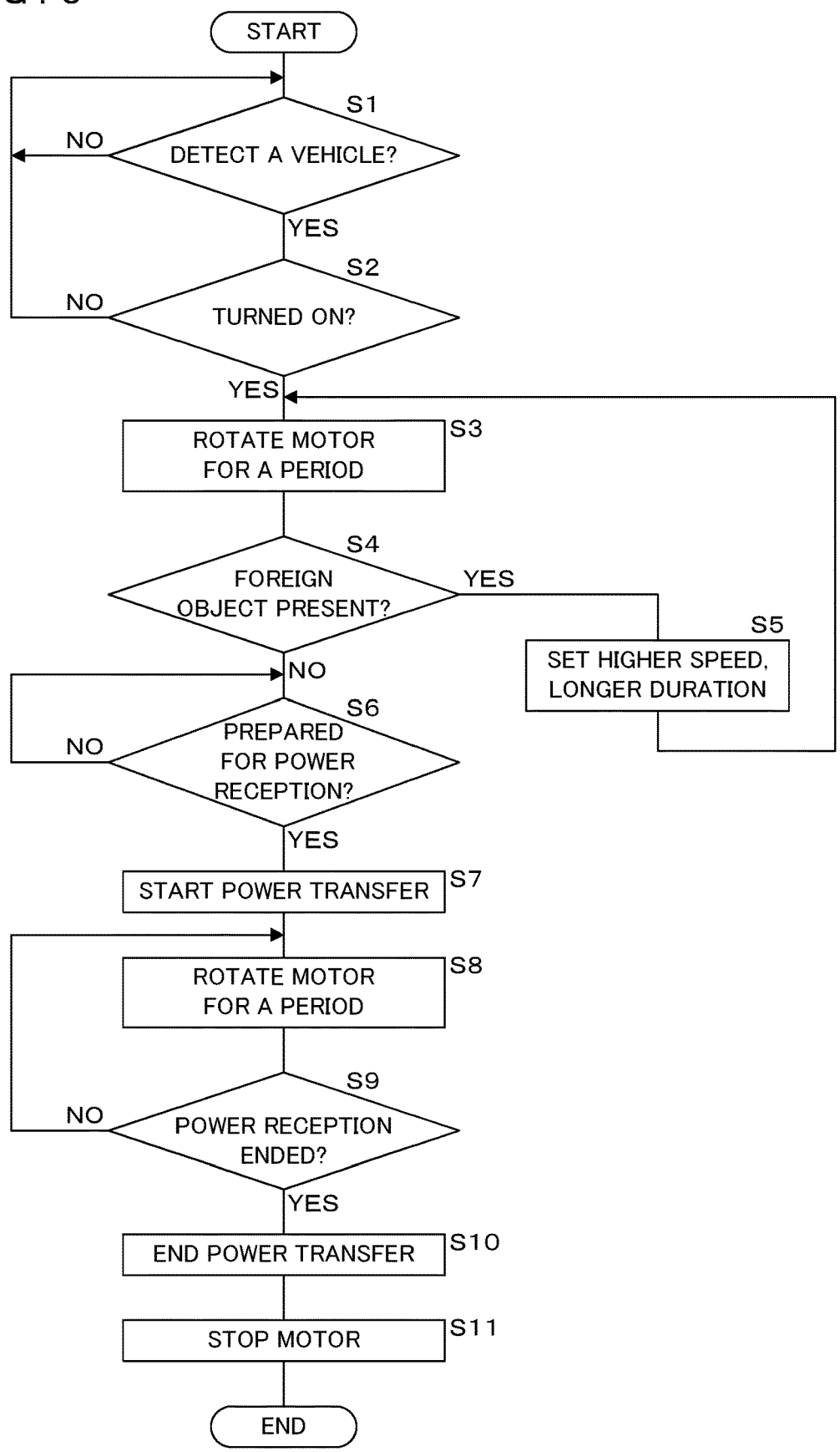
FIG. 6 is a flowchart describing motor driving processing and power transfer processing performed by a CPU.

FIG. 6 is a flowchart describing motor driving processing and power transfer processing performed by the CPU 10*a*. The CPU 10*a* fetches a detection result from the proximity sensor 13 and is held standby until it detects an object such as a vehicle 20 (S1: NO). If the distance detected by the proximity sensor 13 is equal to or less than a threshold previously set, that is, if the distance between the vehicle 20 and the power transfer coil 3 is equal to or less than a predetermined distance, the CPU 10*a* determines that a vehicle is detected.

If the vehicle 20 is detected (S1: YES), the CPU 10*a* fetches a signal of the power transfer start switch 16 and determines whether or not the power transfer start switch 16 is turned on (S2). If the power transfer start switch 16 is not turned on (S2: NO), the CPU 10*a* returns the processing to step S1. If the power transfer start switch 16 is turned on (S2: YES), the CPU 10*a* outputs a driving signal to the motor 5 of the power transfer unit 1 to thereby rotate the motor 5 for a predetermined time period (step S3). The motor 5 stops after a lapse of a predetermined time period from the start of rotation. Note that the driving signal includes a signal indicating a rotation speed and a driving duration of the motor 5 that are stored in the storage unit 10*c*.

The CPU 10*a* fetches imaging data from the camera 14, and performs image processing on the data to thereby determine whether not a foreign object is present on the first surface part 2*a* (S4). If determining that a foreign object is present (S4: YES), the CPU 10*a* changes the rotation speed of the motor stored in the storage unit 10*c* to a higher rotation speed and changes the driving duration of the motor stored in the storage unit 10*c* to a longer driving duration (S5). The CPU 10*a* returns the processing to step S3 and rotates the motor 5 based on the changed rotation speed and driving duration.

If determining that no foreign object is present (S4: NO), the CPU 10*a* is held standby until a preparation for power reception is completed (S6: NO) while communicating with the power reception control device 24. If a preparation for power reception is completed (S6: YES), the CPU 10*a* causes the power transfer unit 1 to start power transfer (S7) and causes the motor 5 to rotate for a predetermined time period (S8). The power transfer unit 1 executes both of power transfer and rotation of the blade 7.

While communicating with the power reception control device 24, the CPU 10*a* determines whether or not the power reception is to be ended (S9). If the power reception is not to be ended (S9: NO), the CPU 10*a* returns the processing to step S8. If the power reception is to be ended (S9: YES), for example, if the power reception control device 24 detects a full charge of the battery 23 and notifies the power transfer control unit 10 of the end of the power reception, the CPU 10*a* ends the power transfer (S10) and stops the motor 5 (S11).

After the vehicle 20 is detected at step S1, the processing at step S3 may be executed without executing processing at step S2. In this case, when the vehicle 20 approaches the power transfer unit 1 or the power transfer control unit 10, the motor 5 starts to drive before starting power transfer without operation of the power transfer start switch 16, whereby the blade 7 starts to rotate. If a preparation for power reception is not completed even after a lapse of a predetermined time period at step S6, the CPU 10*a* may stop the motor 5 and end the processing without executing power transfer. At step S5, the rotation speed and the driving duration of the motor 5 are changed, though any one of the rotation speed and the driving duration may be changed. At step S1, the CPU 10*a* may fetch imaging data from the camera 14, perform image processing thereon, and may detect the presence or absence of the vehicle 20. As described above, the camera 14 can photograph the area above the first surface part 2*a* and can detect the vehicle 20 if the vehicle 20 is located above the case 2.

If no foreign object is detected at step S4 (S4: NO), the CPU 10*a* may perform image processing on the imaging data to thereby determine the presence or absence of damage to the blade 7. If determining that the blade 7 is damaged, the CPU 10*a* notifies the administrative server of abnormality through a network, for example, and ends the motor driving processing and the power transfer processing. If determining that the blade 7 is not damaged, the CPU 10*a* advances the processing to step S6.

In the power transfer device, the control method and the computer program according to Embodiment 1, if the vehicle 20 approaches the power transfer coil 3, the motor 5 is driven to thereby rotate the blade 7. The blade 7 rotates on the first surface part 2*a* of the case 2, which removes the foreign object adhering to the first surface part 2*a* and prevents a living body such as a person, a dog, a cat or the like from entering the first surface part 2*a*. Mere rotation of the blade 7 can thus remove a foreign object and simplify the control for removing a foreign object and preventing entry of a living body.

The blade 7 is rotated only if the power transfer start switch 16 is turned on and the user clearly intends to transfer power, which can reduce power consumption of the power transfer device.

In addition, an image photographed by the camera 14 is processed to thereby determine whether or not a foreign object is present on the first surface part 2*a* of the case 2.

If a foreign object remains on the first surface part 2*a* of the case 2 after rotation of the motor 5, the rotation speed of the motor 5 is changed to a higher rotation speed, or the driving duration of the motor 5 is changed to a longer driving duration. The motor 5 is rotated again based on the changed rotation speed and driving duration, which accelerates the removal of the remaining foreign object and also prevents entry of a living body into the first surface part 2*a*.

The blade 7 is intermittently rotated, which prevents a foreign object from staying on the first surface part 2*a* of the case 2 and also prevents entry of a living body into the first surface part 2*a*.

The blade 7 is rotated after start of power transfer, which enables immediate removal of a foreign object that enters during the power transfer and prevents the foreign object from generating heat. This also prevents entry of a living body into the first surface part 2*a*.

Embodiment 2

Figure 7:
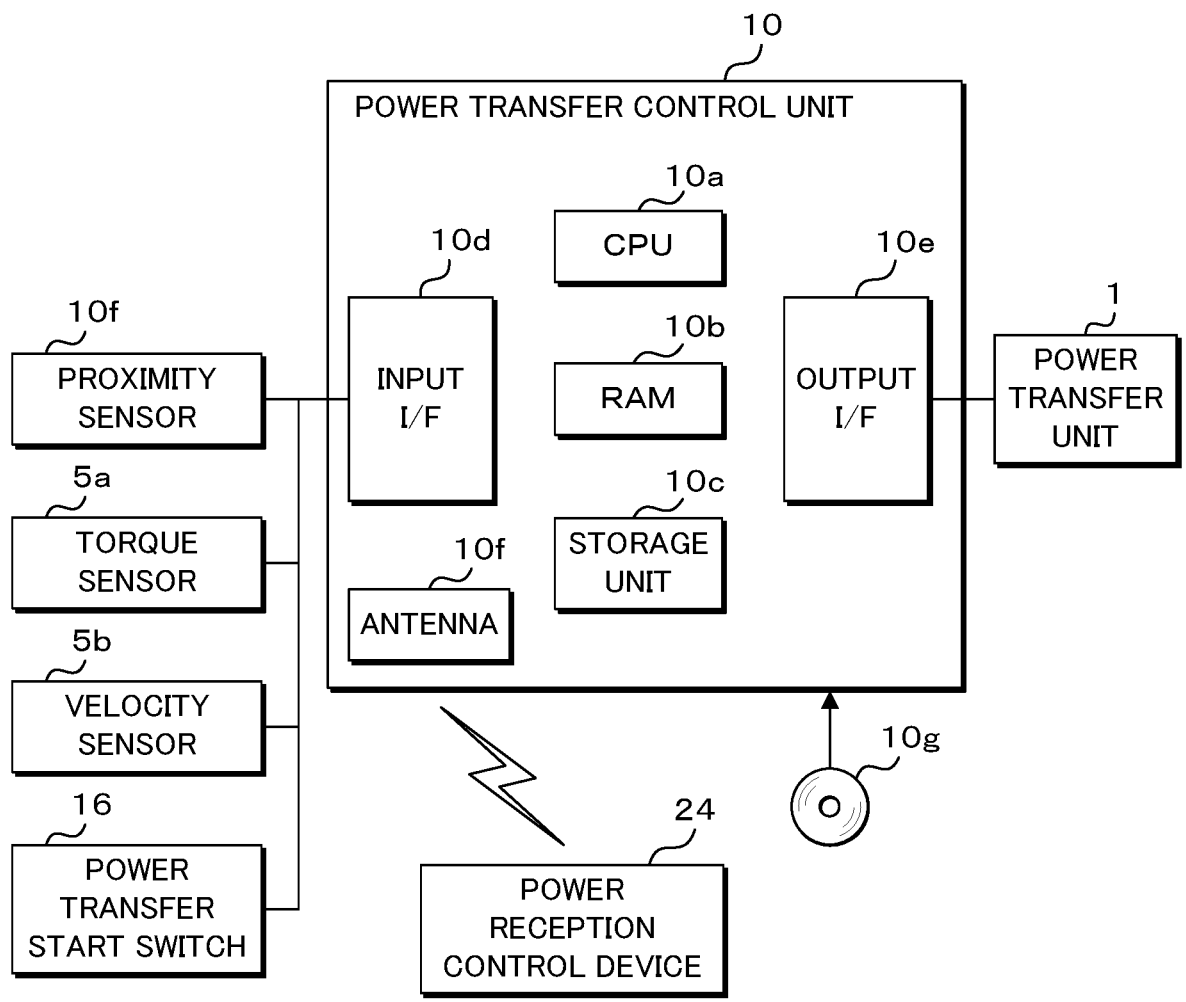
FIG. 7 is a block diagram of a power transfer device according to Embodiment 2.

The present invention will be described below with reference to the drawings illustrating a power transfer device according to Embodiment 2. FIG. 7 is a block diagram of a power transfer device. In Embodiment 2, a torque sensor 5*a* for detecting a torque of the motor 5 and a velocity sensor 5*b* for detecting a rotation speed of the motor 5 are provided in place of the camera 14 in Embodiment 1.

The presence or absence of a foreign object is detected by using the camera 14 at step S4 in Embodiment 1 whereas the presence or absence of a foreign object is detected by using the torque sensor 5*a* or the velocity sensor 5*b* in Embodiment 2. That is, if a torque equal to or larger than a predetermined value is detected by the torque sensor 5*a*, or if a velocity equal to or smaller than a predetermined value is detected by the velocity sensor 5*b*, the presence of a foreign object is detected.

The rest of the motor driving processing and the power transfer processing are similar to those in Embodiment 1 (see FIG. 6). Some of the components in Embodiment 2 similar to those in Embodiment 1 are denoted by the same reference codes and detailed description thereof will not be repeated.

Embodiment 3

Figure 8:
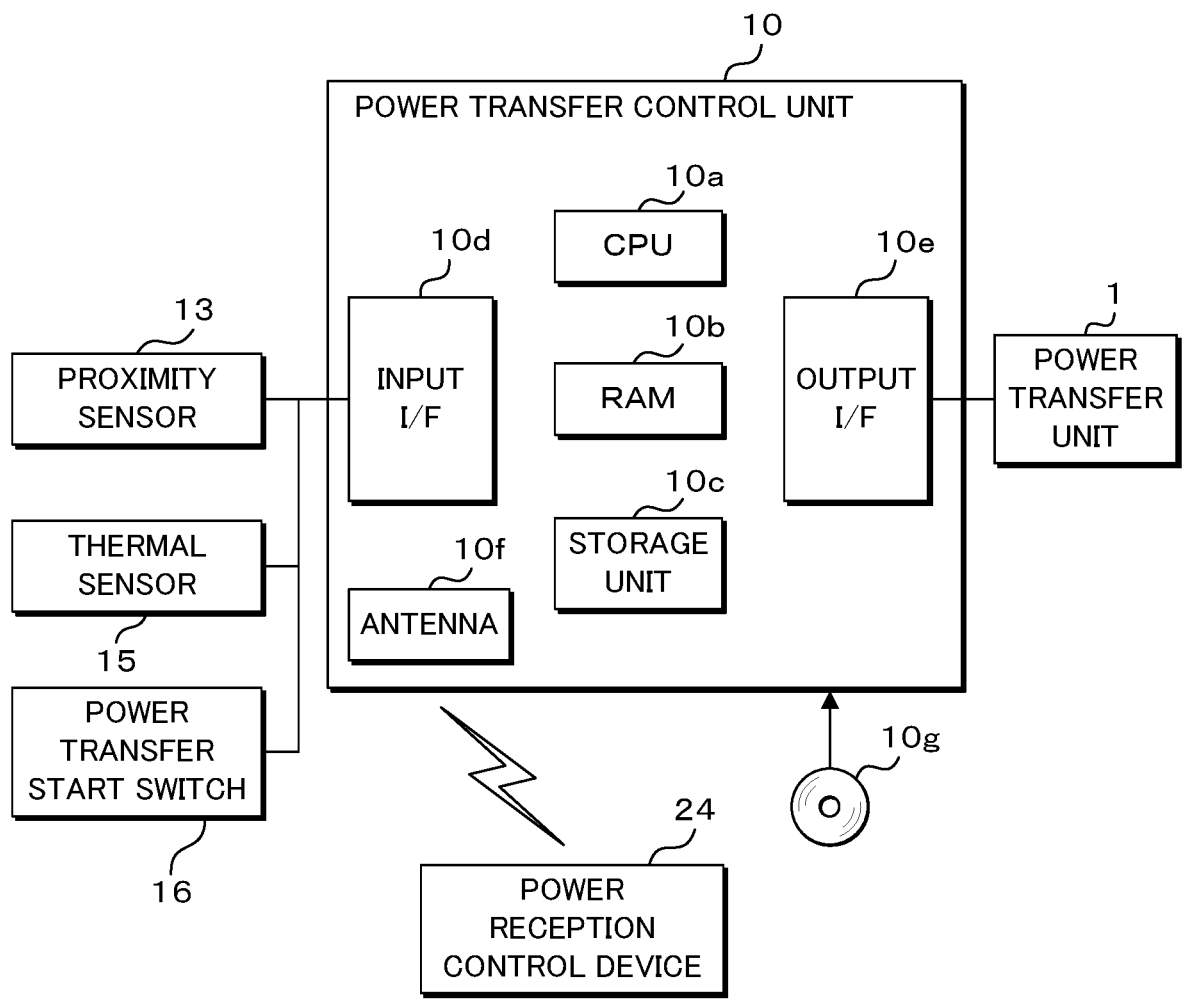
FIG. 8 is a block diagram of a power transfer device according to Embodiment 3.

The present invention will be described below with reference to the drawings illustrating a power transfer device according to Embodiment 3. FIG. 8 is a block diagram of the power transfer device. The power transfer device is provided with a thermal sensor 15 for detecting heat of a first surface part 2*a* of a case 2. The thermal sensor 15 is provided at the one end of a rotating shaft 6, for example, and located above the first surface part 2*a*. The thermal sensor 15 includes an infrared sensor, for example. The region to be detected by the thermal sensor 15 is the entire first surface part 2*a*. To an input I/F 10*d*, a detection result from the thermal sensor 15 can be input.

Note that the thermal sensor 15 may be provided on the side surface 11*a* of the housing 11. The thermal sensor 15 is arranged at a position closer to the ground surface of the side surface 11*a*, and whereby even if the vehicle 20 is located above the power transfer unit 1, the thermal sensor 15 is arranged between the bottom surface of the vehicle 20 and the power transfer unit 1, so that the thermal sensor 15 can set the entire outer surface of the first surface part 2*a* as a region to be detected.

Figure 9:
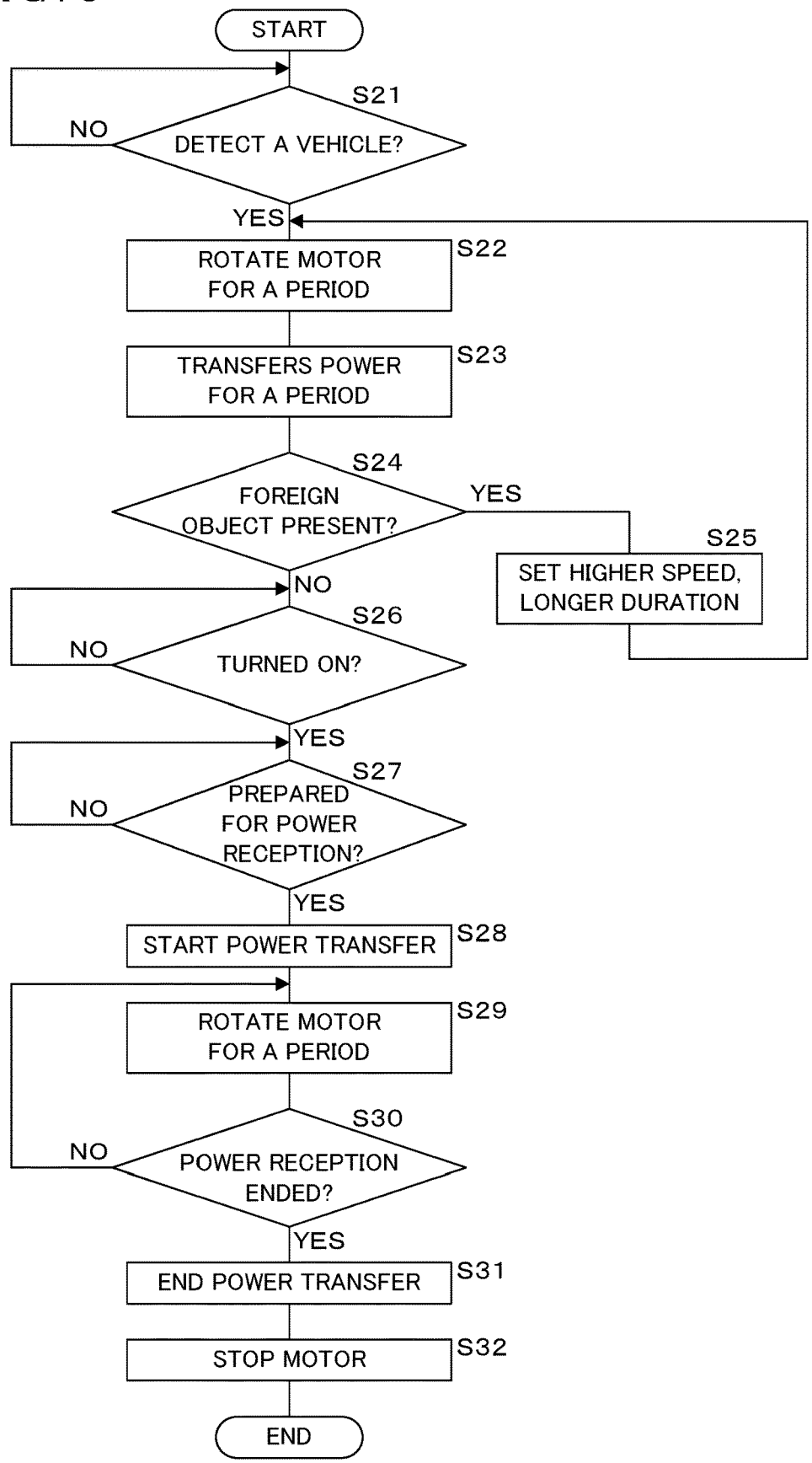
FIG. 9 is a flowchart describing motor driving processing and power transfer processing performed by a CPU.

FIG. 9 is a flowchart describing motor driving processing and power transfer processing performed by the CPU 10*a*. The CPU 10*a* fetches a detection result from the proximity sensor 13 and is held standby until it detects an object, for example, a vehicle 20 (S21: NO). If the vehicle 20 is detected (S21: YES), the CPU 10*a* outputs a driving signal to the motor 5 of the power transfer unit 1 and rotates the motor 5 for a predetermined time period (S22).

The CPU 10*a* transfers power (S23) for a predetermined time period previously set by driving the power transfer unit 1. After transferring power for the predetermined time period, the CPU 10*a* ends the power transfer. The CPU 10*a* fetches a detection result of the thermal sensor 15 and determines whether or not a foreign object, especially, a metallic foreign object is present on the first surface part 2*a* (S24). If a metallic foreign object is present on the first surface part 2*a*, the foreign object generates heat due to power transfer, so that the thermal sensor 15 detects the heat. If determining that a foreign object is present (S24: YES), the CPU 10*a* changes the rotation speed of the motor stored in the storage unit 10*c* to a higher rotation speed and changes the driving duration of the motor stored in the storage unit 10*c* to a longer driving duration (S25). The CPU 10*a* returns the processing to step S22 and rotates the motor 5 based on the changed rotation speed and driving duration.

If determining that no foreign object is present (S24: NO), the CPU 10*a* fetches a signal of the power transfer start switch 16 and determines whether or not the power transfer start switch 16 is turned on (S26). If the power transfer start switch 16 is not turned on (S26: NO), the CPU 10*a* returns the processing to step S26. If the power transfer start switch 16 is turned on (S26: YES), the CPU 10*a* executes the processing at steps S27-S32. The processing at steps S27-S32 is similar to the processing at steps S6-S11 in Embodiment 1 and the detailed description thereof will not be repeated. Note that a camera 14 is added, and the presence or absence of a foreign object may be detected by using the camera 14 as well as the thermal sensor 15 at step S24.

In the power transfer device, the control method and the computer program according to Embodiment 3, if a metallic foreign object, for example, a clip or a coin is present on the first surface part 2*a* of the case 2, the object can be detected by using the thermal sensor 15. If a foreign object is detected, the rotation speed of the motor 5 is changed to a higher rotation speed while the driving duration of the motor 5 is changed to a longer driving duration. The motor 5 is driven again based on the changed rotation speed and driving duration, which accelerates the removal of the remaining foreign object. The metallic foreign object is heavier than a foreign material formed of an organic matter, for example, a leaf and tends to remain on the first surface part 2*a*. The motor 5 is rotated at a higher rotation speed or for a longer driving duration, which enables effective removal of the metallic foreign object. This also prevents entry of a living body into the first surface part 2*a*.

Embodiment 4

Figure 10:
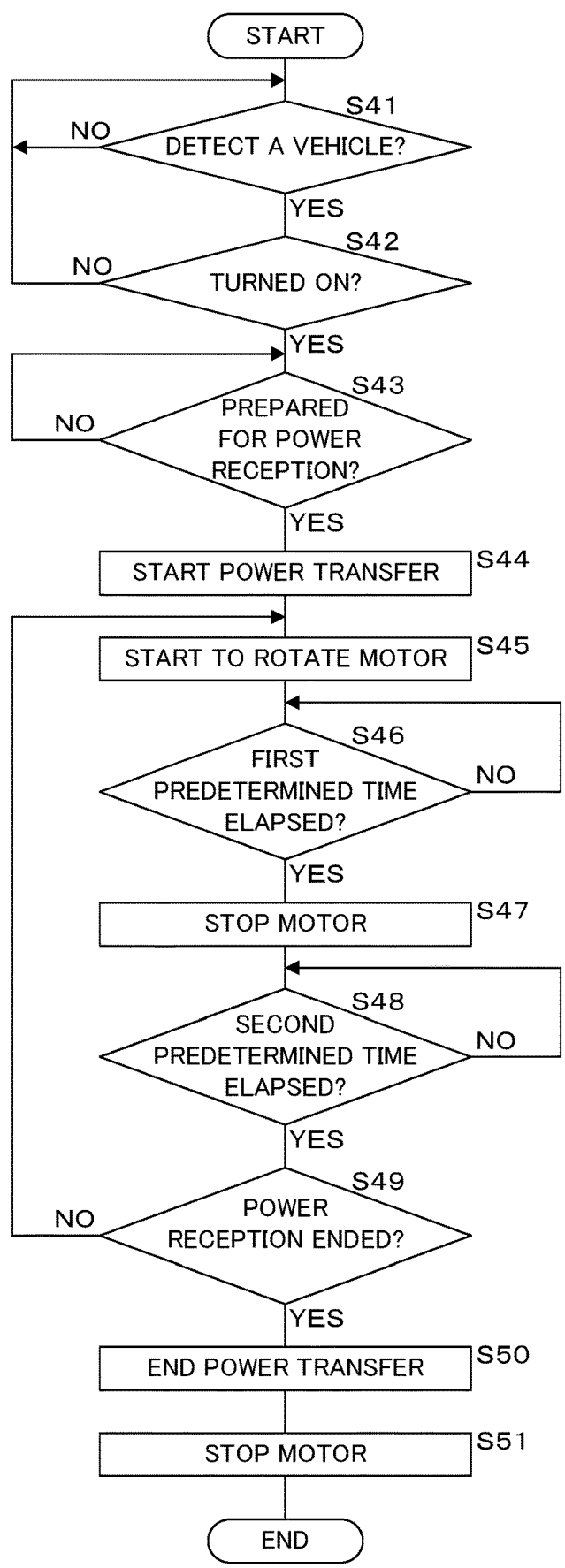
FIG. 10 is a flowchart describing motor driving processing and power transfer processing performed by a CPU according to Embodiment 4.

The present invention will be described below with reference to the drawings illustrating a power transfer device according to Embodiment 4. FIG. 10 is a flowchart describing motor driving processing and power transfer processing performed by a CPU 10*a*. Note that a first predetermined time and a second predetermined time, which will be described later, are stored in advance in a storage unit 10*c*.

The CPU 10*a* fetches a detection result from the proximity sensor 13, and is held standby until it detects an object, for example, a vehicle 20 (S41: NO). If the vehicle 20 is detected (S41: YES), the CPU 10*a* fetches a signal of the power transfer start switch 16 and determines whether or not the power transfer start switch 16 is turned on (S42). If the power transfer start switch 16 is not turned on (S42: NO), the CPU 10*a* returns the processing to step S41. If the power transfer start switch 16 is turned on (S42: YES), the CPU 10*a* is held standby until a preparation for power reception is completed (S43: NO) while communicating with the power reception control device 24.

If the preparation for power reception is completed (S43: YES), the CPU 10*a* causes the power transfer unit 1 to start power transfer (S44) and start to rotate the motor 5 (S45). The CPU 10*a* is held standby until the first predetermined time has elapsed from the start of the rotation of the motor 5 (S46: NO). If the first predetermined time has elapsed (S46: YES), the CPU 10*a* stops the motor 5 (S47).

The CPU 10*a* is held standby until the second predetermined time has elapsed from the stop of the motor 5 (S48: NO). If the second predetermined time has elapsed (S48: YES), the CPU 10*a* determines whether or not the power reception is to be ended (S49) while communicating with the power reception control device 24. If the power reception is not to be ended (S49: NO), the CPU 10*a* returns the processing to S45 to thereby intermittently rotate the motor 5. If the power reception is to be ended (S49: YES), the CPU 10*a* ends the power transfer (S50) and stops the motor 5 (S51).

In the power transfer device, the control method and the computer program according to Embodiment 4, the blade 7 is intermittently rotated, which prevents a foreign object from staying on the first surface part 2*a* of the case 2 and also prevents entry of a living body into the first surface part 2*a*. Some of the components in Embodiment 4 similar to those in Embodiments 1-3 are denoted by the same reference codes and detailed description thereof will not be repeated.

Figure 11:
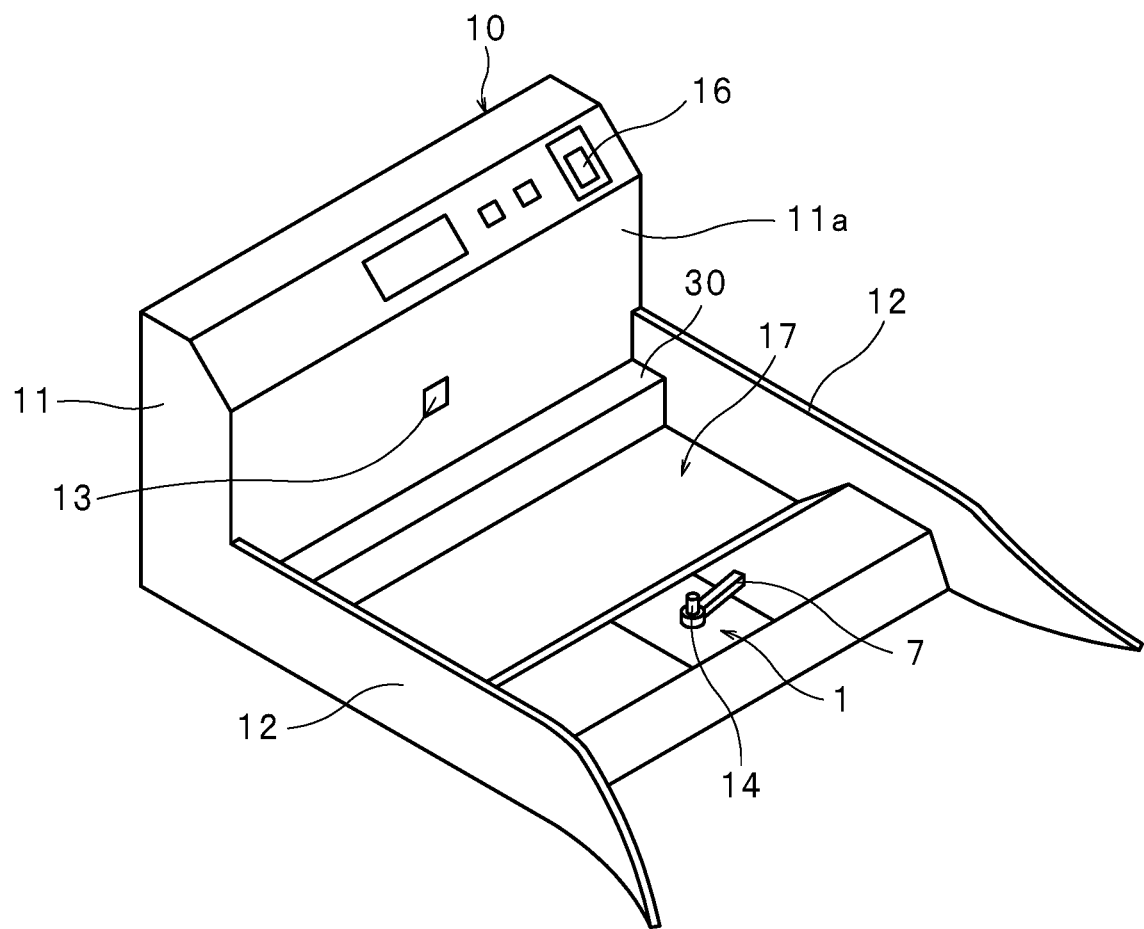
FIG. 11 is a schematic perspective view illustrating a power transfer device according to Embodiment 5.

The present invention will be described below with reference to the drawings illustrating a power transfer device according to Embodiment 5. FIG. 11 is a schematic perspective view illustrating a power transfer device. In Embodiment 5, the power transfer unit 1, the power transfer control unit 10, the guide parts 12 and the vehicle stopper 30 are provided as a unit. In Embodiment 5, one transversely elongated vehicle stopper 30 is integrally provided with the side surface 11a of a housing 11. Between the vehicle stopper 30 and the power transfer unit 1, a recess 17 into which the wheels of the vehicle 20 are to be fit is formed. Some of the components in Embodiment 5 similar to those in Embodiments 1-4 are denoted by the same reference codes and detailed description thereof will not be repeated.

Each of the above-described embodiments is no limited to equipment dedicated for power transfer. The configuration corresponding to each of the above-described embodiments may be added to the equipment in the existing pay parking lot, for example.

Each of the above-described embodiments is no limited to equipment dedicated for power transfer. For example, the configuration corresponding to each of the above-described embodiments may be added to the equipment in the existing pay parking lot.

It is to be noted that, as used herein and in the appended claims, the singular forms "a", "an", and "the" include plural referents unless the context clearly dictates otherwise.

What is claimed is:

1. A power transfer device, comprising:
   a power transfer coil;
   a case that has a surface extending along a direction perpendicular to an axial direction of the power transfer coil and stores the power transfer coil;
   a rotating shaft rotatable about the shaft that extends in the axial direction of the power transfer coil at a central portion in a radial direction of the power transfer coil and has an end penetrating the surface and protruding outward through the surface;
   a foreign object remover that projects outwardly from the end of the rotating shaft in a radial direction of the rotating shaft and moves on the surface;
   a driving source that provides the rotating shaft with power;
   a processor that determines whether or not a vehicle is present;
   a foreign object detector that detects a foreign object
   wherein
   the driving source is driven if the processor determines that the vehicle is present,
   the driving source is driven if the processor determines that the vehicle is present and a foreign object is detected by the foreign object detector,
   the driving source includes a motor,
   the processor determines whether or not a foreign object is detected by the foreign object detector after rotation of the motor;
   the processor changes a rotation speed of the motor to a rotation speed higher than a current rotation speed or a driving duration of the motor to a driving duration longer than a current driving duration if the processor determines that a foreign object is detected, and
   the motor is driven based on a rotation speed or a driving duration changed by the processor.

2. The power transfer device according to claim 1, wherein the driving source is stopped after being driven for a first predetermined time and is driven again after a lapse of a second predetermined time from stop of the driving source.

3. The power transfer device according to claim 1, wherein the driving source is driven after power transfer by the power transfer coil is started.

4. A power transfer device, comprising:
   a power transfer coil;
   a case that has a surface extending along a direction perpendicular to an axial direction of the power transfer coil and stores the power transfer coil;
   a rotating shaft rotatable about the shaft that extends in the axial direction of the power transfer coil at a central portion in a radial direction of the power transfer coil and has an end penetrating the surface and protruding outward through the surface;
   a foreign object remover that projects outwardly from the end of the rotating shaft in a radial direction of the rotating shaft and moves on the surface;
   a driving source that provides the rotating shaft with power;
   a processor that determines whether or not a vehicle is present
   a foreign object detector that detects a foreign object
   wherein
   the driving source is driven if the processor determines that the vehicle is present,
   the driving source is driven if the processor determines that the vehicle is present and a foreign object is detected by the foreign object detector,
   the driving source includes a motor,
   the foreign object detector includes a torque detector for detecting a torque of the motor or a speed detector for detecting a rotation speed of the motor and the foreign object detector determines that a foreign object is detected if a torque equal to or larger than a threshold set in advance is detected by the torque detector, or if a speed equal to or smaller than a threshold set in advance is detected by the speed detector.

5. The power transfer device according to claim 4, wherein:
   the processor determines whether or not a foreign object is detected by the foreign object detector after rotation of the motor; and
   the processor changes a rotation speed of the motor to a rotation speed higher than a current rotation speed or a driving duration of the motor to a driving duration longer than a current driving duration if the processor determines that a foreign object is detected, wherein
   the motor is driven based on a rotation speed or a driving duration changed by the processor.

* * * * *